Sept. 27, 1938. C. W. WALLER 2,131,155
AIRCRAFT
Filed Nov. 27, 1935 5 Sheets-Sheet 1

Fig.1

Inventor:
Charles W. Waller

Sept. 27, 1938.  C. W. WALLER  2,131,155
AIRCRAFT
Filed Nov. 27, 1935   5 Sheets-Sheet 2

Fig. 2

Inventor:
Charles W. Waller

Sept. 27, 1938.    C. W. WALLER    2,131,155
AIRCRAFT
Filed Nov. 27, 1935    5 Sheets-Sheet 3

Fig. 3

Inventor:
Charles W. Waller

Sept. 27, 1938. C. W. WALLER 2,131,155
AIRCRAFT
Filed Nov. 27, 1935 5 Sheets-Sheet 4

Inventor:
Charles W. Waller

Patented Sept. 27, 1938

2,131,155

UNITED STATES PATENT OFFICE 2,131,155

AIRCRAFT

Charles W. Waller, Chicago, Ill.

Application November 27, 1935, Serial No. 51,829

20 Claims. (Cl. 244—56)

This invention pertains to aircraft, particularly to vertical lift aircraft, such as, for instance, helicopters and autogiros, and more particularly to airships, and one object in view is to provide a universal flying machine, preferably in the form of an airship of the pressure type, such as, for instance, the non-rigid or "blimp" and semi-rigid types, and adapted to vertically ascend from, and descend to, an area no larger than its own perimeter, or the flat roof of a building, or the deck of a ship, or a space on the ground no larger than the area in which it takes to park the said aircraft.

Another object in view is to provide a universal flying machine, preferably in the form of an airship, which will be small and compact horizontally, comparatively inexpensive to construct, easily operated and controlled, especially vertically, and employing an exceedingly small and inexpensive gas or oil motor, such as, for instance, the Meteormotor, or a suitable motorcycle, automobile or Diesel type engine.

A further object in view is to provide an aircraft in the form of an airship in which automatic upright stability is maintained by the inherent component upward force or pull of the lifting gas on the upper or gas-bag portion, and the downward force or pull of gravity on the lower or body portion of the said airship.

A still further object in view is to provide an aircraft adapted to easily utilize its propeller thrust for controlling its various movements thru the air, such as, for instance, vertically and diagonally ascending and descending, as well as forward propulsion and steering the said aircraft either to the right or left, thus eliminating the necessity of employing a vertical steering rudder, if desired.

I attain these objects by mechanism illustrated in the accompanying drawings, in which—

Similar numerals refer to similar parts throughout the several views.

Referring to the present invention shown in Figures 1 to 6, inclusive, a suitable supporting device is provided, preferably a gas envelope or cell 1, which may be of any suitable form, but is preferably, as shown, a suitably longitudinally streamlined and vertically elongated fabric or metal envelope of the non-rigid pressure type, interior longitudinal and/or transverse cables or cords, not shown, being provided, if desired, to assist in preserving its streamline form.

This envelope or cell is filled with any suitable buoyant or lifting gas, such as, for instance, coal gas, but is preferably filled with either hydrogen or a non-inflammable gas, such as helium gas, and as near to a constant weight and volume of lifting gas as will retain the said airship as nearly as possible; first, in equilibrium, or, second, slightly heavier in weight than when in equilibrium, or, third, slightly lighter in weight than when in equilibrium, as desired, the relative position and vertical pull of the propeller being determined upwardly or downwardly accordingly, in controlling the upward and downward movements of the said airship.

The lower end or wall of the said gas envelope or cell forming and adapted to function as a common air-ballonet diaphragm 2, and thereby forming, in effect, a conventional air-ballonet 3.

An air-ballonet bottom 4, preferably rigid and of suitable material and also longitudinally of streamlined form, is disposed below said diaphragm 2 and ballonet 3, forming a combined bottom for said ballonet 3 and a roof for a car frame or body structure 5.

A suitable or conventional air-valve 6 is provided for said ballonet 3, secured to said bottom 4 and operated by means of a common control cord 7 and bell crank or elbow lever 8, when desiring to release air from said ballonet 3.

The said car frame or body structure 5 is suspended from the said supporting device or envelope 1 by means of an interior concentrically arranged or horizontally disposed suspension attachment band 9 and an exterior depending or vertically extended suspension means or load supporting member or flange 10 of the said bottom 4 by any suitable means, such as, for instance, four-finger silk-tape patches, cementing, riveting, taping, stitching, sewing or lacing, the said envelope preferably suitably reinforced at this point by taping, cementing and stitching or lacing, the said band 9 and flange 10 being adapted to also function to assist in preserving or maintaining the streamline form of the lower portion of the gas envelope 1.

An operator's seat 11 is provided within convenient reach of said bell crank 8 and other operating means, as hereinafter more fully shown and described.

In order to permit the said airship to be moved about and positioned on the ground as desired, the said car frame or body structure 5 is provided with two forwardly and one rearwardly disposed swivel or caster wheels 12, such as airplane landing wheels, and in order to still more lighten the craft, the said seat and wheels are adapted to be filled with suitable lifting gas, if desired.

Figure 2:
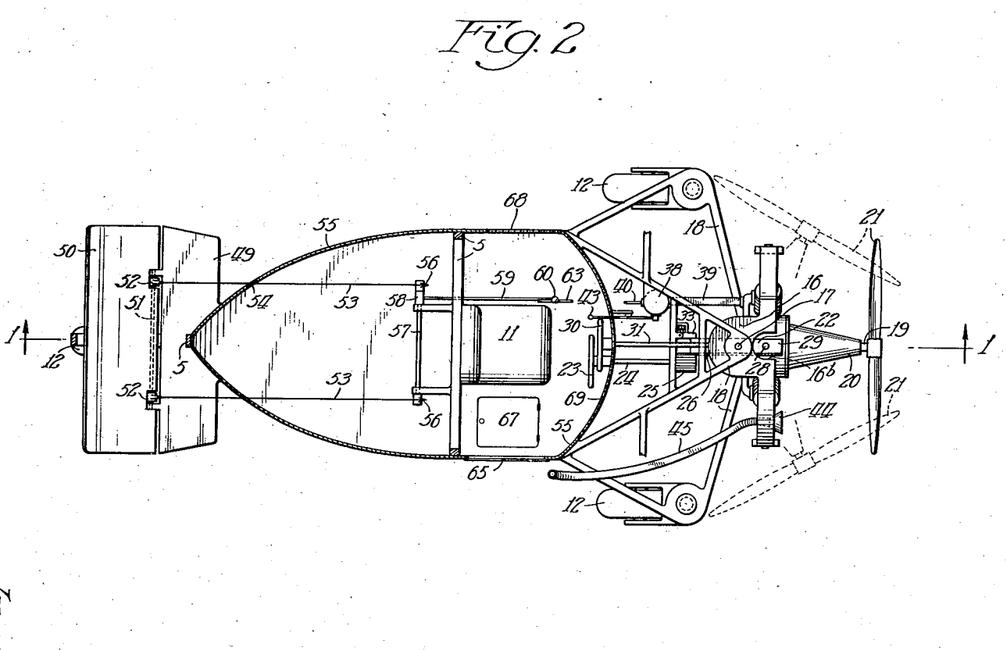
Figure 2 is a plan view of the same, on line 2—2 of Figure 1, and looking in the direction of the arrows.

A non-electric motor 13, preferably counterbalanced which may, if desired, be of an oil type, or, preferably, as shown, in the form of an air-cooled type gas or gasoline engine, is provided with lateral horizontally disposed motor supporting and rotating members or arms 14, pivoted in bearings 14ª, the said motor adapted to be rotated in a vertical plane on a transverse axis, within a vertically disposed pivoted transverse motor supporting and rotating frame 15, the said frame provided with upper and lower rearwardly disposed center horizontal extensions 16, the upper one of which preferably has one of its sides or faces provided with cogs or teeth 16ª, the said extensions 16 pivoted in bearings 17, thus adapting the said motor and a propeller 21 to be moved or adjusted to the right or left in a horizontal plane, as shown by dotted lines 21 in Figure 2, the said propeller thus adapted to function in steering the aircraft either to the right or left, as desired, and eliminating the use of a vertical steering rudder.

In order to counteract or compensate for any tendency of the air pressure or drag on the upper portion of the bow or nose of said gas envelope 1 to cant or tilt backwardly while said airship is moving or traveling forward thru the air, the weight carried by or comprising the forward portion of said car frame or body structure 5, such as the operator, motor, and other parts comprising the forward portion of said frame, are preferably disposed forward of the center of lift or gravity of the said airship, thus creating a tendency on the part of the nose or bow of said envelope 1 to automatically or inherently slightly cant or tilt forwardly, and which canting or tilting tendency is overcome or corrected when said aircraft is traveling forward thru the air.

Thus it will be seen that while the airship is ascending or descending, it will automatically or inherently take the forward tilting or canting position, but will also take a more perfect vertical position while traveling forward thru the air.

It will also be seen that brace members 18 of the said frame 5 form in effect an auxiliary or outrigged motor mounting and supporting frame for the said motor 13.

Figure 5:
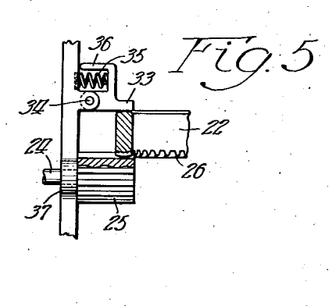
Figure 5 is an enlarged top fragmentary view of certain parts in normal position for the forward propulsion thru the air of the said aircraft by said motor and propeller, on line 5—5 of Figure 1, and looking in the direction of the arrows.
Figure 6:
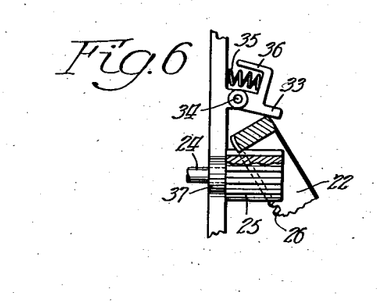
Figure 6 is a similar view of the said parts in a different operative position, such as, when the propeller is swung toward the right side, as shown by the dotted lines in Figure 2, in order to adapt the said propeller to function instead of a vertical rudder to steer the said craft to one side.

A propeller shaft 19 extends forwardly from the said motor 13 thru a tapered or cone-shaped propeller-shaft bearing 20, the small end portion thereof adapted to come to rest within or against the bottom of either the upper or lower recess 16ᵇ in the said extensions 16 whenever the said bearing 20 should be adjusted vertically, as when, for instance, the said propeller is disposed for a direct vertical pull either upwardly or downwardly, at the will of the operator, by means of a vertically disposed cogged or geared sector or segment 22, thus adapting the said motor and propeller to be adjustably set and locked in any desired operative position by means of a manually operated controlling or adjusting hand-wheel 23, adapted to rotate a horizontal shaft 24 at the end of which is secured a horizontally elongated spur gear or driving pinion 25 which engages or meshes with cogs or teeth 26 on one side or face of the said sector or segment 22, a portion of the said cogs or teeth 26 adapted to slide horizontally forwardly and backwardly over the teeth of the said gear 25 as the forward portion of the said sector 22 is turned or disposed to one side, or moved back into a longitudinal position, as shown in Figs. 5 and 6, the said propeller provided with any suitable number of blades, such as, for instance, two, three, or four.

The said motor 13 is also provided with vertically disposed sector connecting members or arms 27, the outer ends 28 of which are pivoted to the end portions 29 of the sector 22, so that when the said frame 15 is rotated either to the right or left in a horizontal plane by means of a second manually operated controlling or adjusting hand-wheel 30 on a second horizontal shaft 31 adapted to revolve a second spur gear or driving pinion 32 in mesh with said cogs or teeth 16ª, the said sector 22 automatically changes from the position shown in Figure 5 to other changed positions in various degrees, one such position of which is shown in Figure 6, depending on, in this instance, how far to the right or in a horizontal plane it is desired to move the said motor 13 and propeller shaft 19 in order to adjust the said propeller 21 to a desired right-hand steering position. It being understood that the hand wheels 23 and 30, may, if desired, be entirely eliminated and any suitable power means be employed to actuate the spur gears 25 and 32, instead of manually, as shown.

The said sector 22 is automatically held in its various changed positions or degrees by means of a resilient or automatic guide member 33, hinged at 34 and adapted to automatically operatively hold the said sector 22 in mesh with the said gear 25 by means of pressure exerted by a coiled or spiral expansion spring 35, a stop or extension finger 36 provided to prevent too great a movement outwardly or away from said sector.

The numeral 37 indicates a bearing or mounting for the said shaft 24, a similar bearing being provided for the said second shaft 31.

When the propeller 21 is turned or swung to the left-hand side of the said aircraft, the ends of the said sector 22 are slightly turned or pointed toward the left or in the opposite direction to that shown in Figure 6, and the said guide member 33 then disposed within the said sector 22, whereas, when the said sector is turned to the right-hand side and disposed in the opposite direction, the said gear 25 then being disposed within the said sector 22, as shown in Figure 6, whereas, when the said motor and propeller are adjusted in a vertical plane, the said sector is disposed in the operative position shown in Figures 1 to 5, inclusive, and adapted for rotation on a transverse axis.

In practice, the teeth 26 on the right-hand side of the sector or segment 22 frictionally move or slide forward and backward over the teeth on the longitudinally elongated spur gear 25, while the untoothed or left-hand side of the said sector 22 frictionally moves or slides forward and backward over the right-hand side surface of the guide member 33, while the motor 13 and propeller 21 are being adjusted to one side or the other because of the motor rotating-and-supporting frame 15 turning or rotating on a different pivotal center (17) than the pivotal center formed by the ends 28 of the outer or free ends or end portions 29 of the sector 22, the principle of operation or functioning being performed more in detail, as follows:

In order to steer to the right, the left-hand side of the hand-wheel 30 is turned or rotated downwardly, thus causing the spur gear 32 to mesh with the teeth 16a on the extension 16, pivoted at 17, to force or cause the frame 15 and propeller 21 to swing to the right and also simultaneously to draw the said pivotal-center outer ends 28 (to which ends 28 are pivoted the outer end portions 29 of the sector 22, forming a pivotal center) toward the right, which in turn causes the teeth 26 on the sector 22 to automatically frictionally move or slide backwardly, the extreme forward corner of the said teeth being either held in mesh or locked with the teeth on the spur gear 25, and the untoothed or left side of the said sector being held against the inner side of the guide member 33 by means of the pressure exerted against the outer left side or rear corner of the said sector 22 by the spring 35, as shown most clearly in Fig. 6.

In order to steer to the left, the right-hand side of the hand-wheel 30 is rotated downwardly, thus likewise causing the said spur gear 32 to mesh with the said teeth 16a on the said pivoted extension 16, to likewise force or cause the said frame 15 and propeller 21 to swing to the left and in a like manner simultaneously draw the pivotal center 28 of the said outer end portions 29 toward the left, which, in turn, causes the left or untoothed side of the sector 22 to frictionally move or slide backwardly over the inner surface of the guide member 33, the rearward corner of the said teeth 26 being either held in mesh or locked with the teeth on the spur gear 25 by likewise exerting pressure against the left side or inner corner of the said sector 22 by the said spring 35.

In order to steer straight ahead from either the right or the left position of the said frame 15 and propeller 21, the said hand-wheel 30 is rotated accordingly up or down to bring the said frame 15 and propeller 21 into a longitudinal or straight forward pulling direction, either causing the said teeth 26 to frictionally move or slide forward over the longitudinally elongated teeth of the gear 25 if turned from the right-side-position, as shown in Fig. 6, or causing the said untoothed side of the said sector 22 to frictionally move or slide forwardly over or against the guide member 33, to assume the position as shown most clearly in Fig. 5, the guide member 33 locking the said sector 22 in place by means of the teeth 26 being in mesh with the longitudinally elongated teeth of the gear 25, caused by the pressure of the spring 35 against the left or untoothed side of the said sector 22, as also shown most clearly in Fig. 5.

In order to permit the said motor 13 to be tilted in various desired positions or degrees and thereby the propeller 21 pointed in various desired directions, a carburetor 38 is detached from the said motor 13 and is instead connected to the said motor by means of a flexible feed connection, such as, for instance, a fuel induction or intake line 39, a gravity fuel feed line 40 connecting said carburetor to a fuel tank 41; the numeral 42 indicating the fuel tank intake pipe, and 43 a gas throttle or its equivalent.

As a means of supplying air to the said ballonet 3, a suitable air-scoop 44 is disposed aft of the said propeller and adapted to at all times move with, and remain disposed rearwardly of the said propeller regardless of to what position said propeller may be adjusted or disposed, a suitable flexible air-duct or air-manifold 45 connecting said air-scoop with said ballonet, 46 indicating a conventional air damper and damper-guard disposed within the said ballonet and operated by means of a lever 47 and vertical hand-rod 48 within convenient reach of the operator.

In order to trim ship when the said aircraft is inclined to rotate on its transverse horizontal axis, and also to assist in diagonally steering the craft up or down, a common stabilizer 49 and elevator or rudder 50 are provided and hinged at 51, the said elevator or rudder being controlled by means of horns 52 connected to control lines or cables 53 which pass thru openings or slots 54 in the wall or covering of a car or body 55, similar horns or lever arms 56 pivoted at each end of a rod 57 and secured to the frame 5 and controlled by a pivoted lever arm 58 secured to a longitudinal connecting rod 59 pivoted to an upright hand-control lever 60, intermediately connected at 61 and pivoted at 62, and locked or held in place by a dog and ratchet mechanism 63 secured to the car or body floor 64. In order to either steer the aircraft to the right or left without the use of the propeller 21, or to assist the said propeller in steering to the right or left, it is to be understood that either the said common stabilizer 49 and/or rudder or elevator 50 may, if desired, be disposed vertically instead of, or in conjunction with, being disposed horizontally, as shown.

The numeral 65 designates a side door in the said wall or covering, and 66 a downward-visibility opening or window in the said floor, and which is provided with a floor door 67 for closing the said opening 66, 68 designating a side window in the said car wall 55, and 69 is a curved windshield.

Figure 1:
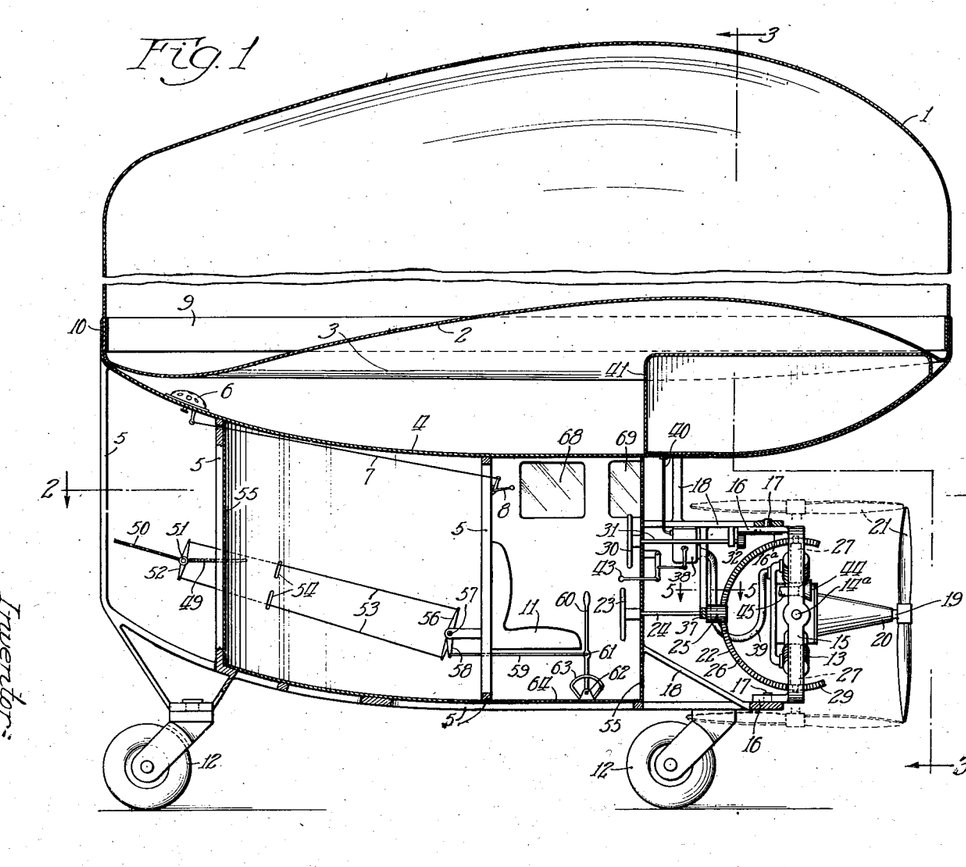
Figure 1 is a side elevation of the present invention, partly in section, on line 1—1 of Fig. 2, and looking in the direction of the arrows.
Figure 3:
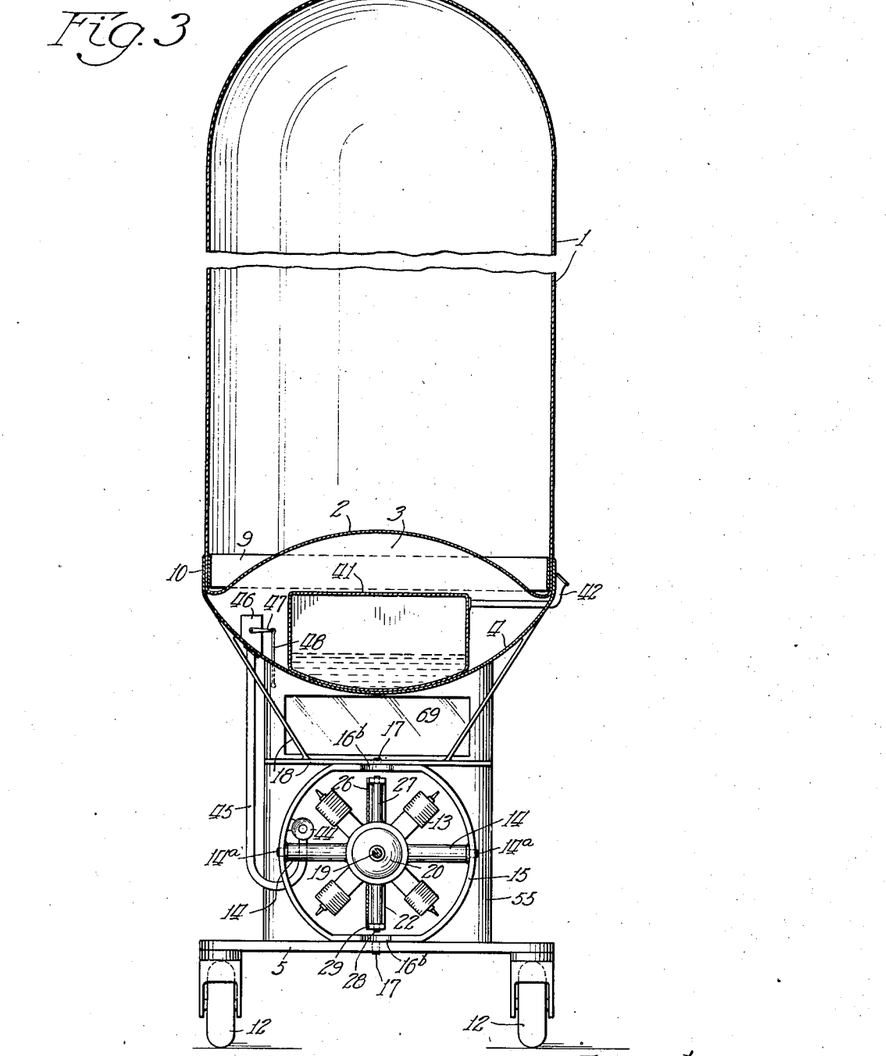
Figure 3 is a front elevation of the same, on line 3—3 of Figure 1, and looking in the direction of the arrows.
Figure 4:
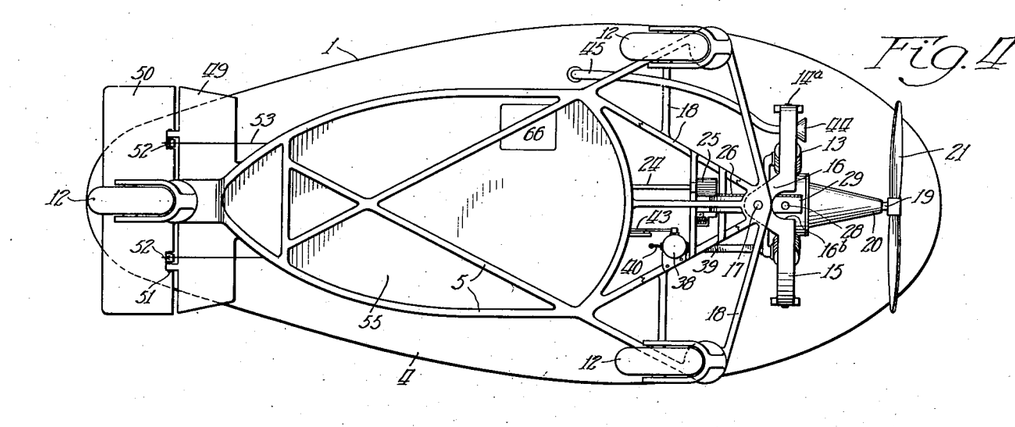
Figure 4 is a bottom view of the same.
Figure 7:
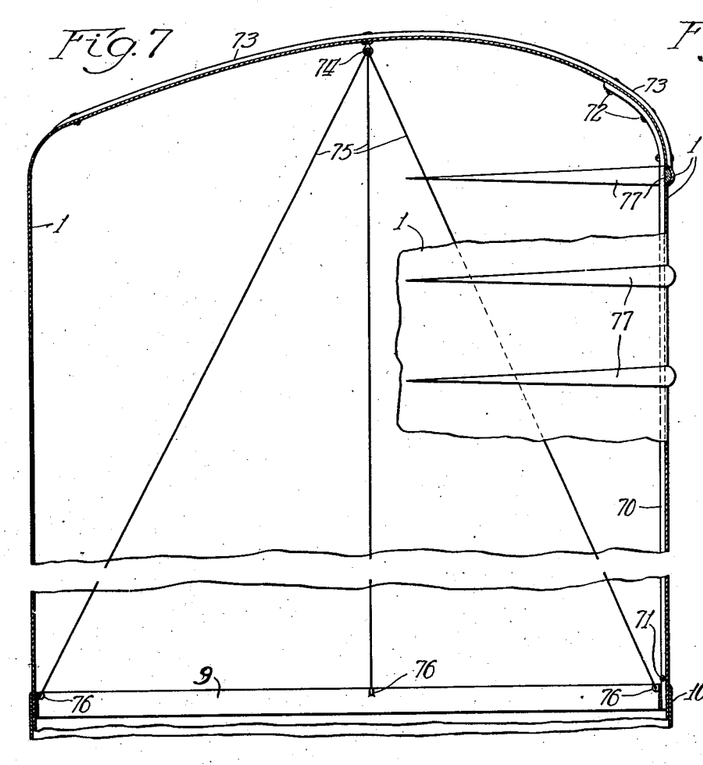
Figure 7 is a side elevation in section, of a modified or semi-rigid form of the upper portion or supporting device of the present invention.
Figure 8:
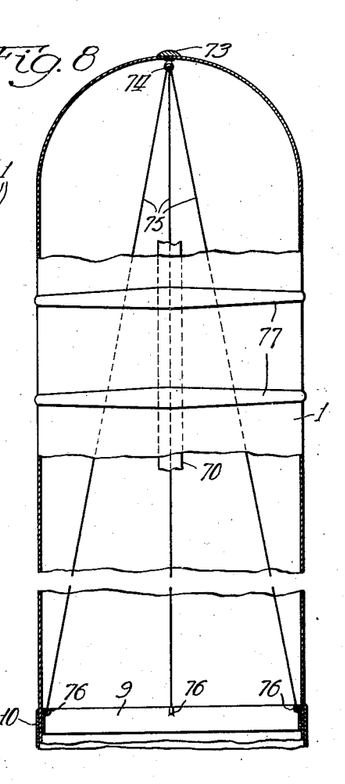
Figure 8 is a front elevation of the same.

Referring to the modified or semi-rigid form of the present invention shown in Figures 7 and 8, the said supporting device is, in the present instance also, a gas envelope, preferably streamlined and provided with a vertical bow or nose stiffener member 70, which preferably is hinged at 71 and extends upwardly to its rearwardly curved upper portion, the said hinged nose stiffener or member 70 eliminating the necessity of disposing the weight of the operator, motor, etc., as much forward of the center of lift or gravity as in the case of the form of the gas envelope shown in Figures 1, 3 and 4, since any air pressure against the said nose stiffener or member 70 will cause the same to yield backwardly above the said hinged point 71 and adapted to automatically straighten up as the wind pressure decreases, while the said car frame 5 will have a tendency to keep on a more even keel.

Suitable fastening or securing means 72, such as, for instance, screw bolts and nuts serve to hold the said upper portion of the said stiffener 70 to the forward end or portion of a longitudinally disposed trajectory suspension member or streamlined top-stiffener 73, the said bolts and nuts passing thru the wall of the envelope 1, and thus insuring a gas tight connection, the said stiffeners 70 and 73 and envelope I reinforcing one another at this point by means of the said means 72.

In order to assist in suspending the car frame or body and reducing strain at the lower portion of said envelope, a securing member or ring 74 is secured to the underside of said stiffener 73 and within the said envelope I, to which are secured internal downwardly and diagonally extending suspension cables or cords 75, the lower ends of which are secured to similar securing members or rings 76 on the said band 9.

If desired to further stiffen the nose of the said envelope I while said airship is moving forward thru the air, transverse superposed bow-stiffeners or battens 77 are disposed one above the other, and secured to and curved rearwardly from the said stiffener or member 70, the wall of the said envelope I is laid over or disposed externally of the said stiffeners 70 and 77, as shown in Figures 7 and 8.

Ball or roller bearings are preferably provided at 14ª, 17, 19, 28 and 33, respectively, in order, obviously, to insure easy turning of the parts at the said respective places or points.

If desired to still more reduce the amount of drag or wind resistance against the nose or bow of the said envelope I, the said envelope is tapered upwardly so that the resistance area and thereby the wind resistance is decreased more and more towards the top or upper portion of said envelope, thus contributing to greater longitudinal stability of said envelope and the aircraft as a whole.

I claim:

1. In an aircraft, a car body having an outrigged mounting provided with a vertical transverse frame disposed at one end thereof, a motor and propeller pivotally supported thereby, a vertical longitudinally arranged sector connected to said motor and having teeth on one side, and a spur gear adapted to mesh with said sector, a guide member in frictional contact with the untoothed side of said sector, a carburetor and a flexible feed connection therefor, said frame adapted to support and simultaneously rotate said motor and propeller in a semi-circular plane on a transverse horizontal axis, whereby said propeller when actuated by said motor is adapted to cause said aircraft to be propelled forwardly, or to vertically ascend or descend.

2. In an aircraft, a car body having an outrigged mounting provided with a vertical transverse frame disposed at one end thereof, a motor and propeller pivotally supported thereby, a vertical longitudinally arranged sector connected to said motor and having teeth on one side, and a spur gear adapted to mesh with said sector, a guide member in frictional contact with the untoothed side of said sector, said sector pivoted to vertical connecting members extending from said motor, a carburetor and a flexible feed connection therefor, said frame adapted to support and simultaneously rotate said motor and propeller in a semi-circular plane on a transverse horizontal axis, whereby said propeller when actuated by said motor is adapted to cause said aircraft to be propelled forwardly, or to vertically ascend or descend.

3. In an aircraft, a car body having an outrigged mounting provided with a vertical transverse frame disposed at one exterior end thereof, a motor and propeller pivotally supported thereby, a vertical longitudinally arranged sector connected to said motor and having teeth on one side, a spur gear adapted to mesh with said sector, a guide member in frictional contact with the untoothed side of said sector, a carburetor and a flexible feed connection therefor and a fuel feed line, said frame adapted to support and simultaneously rotate said motor and propeller in a semi-circular plane on a transverse horizontal axis, whereby said propeller when actuated by said motor is adapted to cause said aircraft to be propelled forwardly, or to vertically ascend or descend.

4. In an aircraft, a car body having an outrigged mounting provided with a vertical transverse frame disposed at one exterior end thereof, a motor and propeller pivotally supported thereby, a vertical longitudinally arranged sector connected to said motor and having teeth on one side, a spur gear adapted to mesh with said sector, a guide member in frictional contact with the untoothed side of said sector, said guide member provided with a spring, a carburetor and a flexible feed connection therefor, said frame adapted to support and simultaneously rotate said motor and propeller in a semi-circular plane on a transverse horizontal axis, whereby said propeller when actuated by said motor is adapted to cause said aircraft to be propelled forwardly, or to vertically ascend or descend.

5. In an aircraft, a car body having an outrigged mounting provided with a vertical transverse frame disposed at one exterior end thereof, a motor and propeller pivotally supported thereby, a vertical longitudinally arranged sector connected to said motor and having teeth on one side, a spur gear adapted to mesh with said sector, a guide member in frictional contact with the untoothed side of said sector, said guide member provided with a stop, a carburetor and a flexible feed connection therefor, said frame adapted to support and simultaneously rotate said motor and propeller in a semi-circular plane on a transverse horizontal axis, whereby said propeller when actuated by said motor is adapted to cause said aircraft to be propelled forwardly, or to vertically ascend or descend.

6. In an aircraft, a car body having an outrigged mounting provided with a vertical transverse frame disposed at one exterior end thereof, a motor and propeller pivotally supported thereby, a vertical longitudinally arranged sector connected to said motor and having teeth on one side, a spur gear adapted to mesh with said sector, a guide member in frictional contact with the untoothed side of said sector, a carburetor and a flexible feed connection therefor, a throttle connected to said carburetor, said frame adapted to support and simultaneously rotate said motor and propeller in a semi-circular plane on a transverse horizontal axis, whereby said propeller when actuated by said motor is adapted to cause said aircraft to be propelled forwardly, or to vertically ascend or descend.

7. In an aircraft, a car body having an outrigged mounting provided with a vertical transverse frame disposed at one exterior end thereof, a motor and propeller pivotally supported thereby, a vertical longitudinally arranged sector connected to said motor and having teeth on one side, a spur gear adapted to mesh with said sector, a guide member in frictional contact with the untoothed side of said sector, said frame pivoted to horizontal connecting members extending from said motor, a carburetor and a flexible feed connection therefor, said frame adapted to support and simultaneously rotate said motor and propeller in a semi-circular plane on a transverse axis, whereby said propeller when actuated by said motor is adapted to cause said aircraft to be propelled forwardly, or to vertically ascend or descend.

8. In an aircraft, a car body having an outrigged mounting provided with a vertical transverse frame disposed at one end thereof, a motor and propeller pivotally supported thereby, a vertical longitudinally arranged sector connected to said motor and having teeth on one side, a spur gear adapted to mesh with said sector, a guide member in frictional contact with the untoothed side of said sector, a carburetor and a flexible feed connection therefor, a propeller shaft extending from said motor thru a tapered propeller-shaft bearing, and said frame adapted to support and simultaneously rotate said motor and propeller in a semi-circular plane on a transverse horizontal axis, whereby said propeller when actuated by said motor is adapted to cause said aircraft to be propelled forwardly, or to ascend or descend vertically.

9. In an aircraft, a car body having an outrigged mounting provided with a vertical transverse frame disposed at one end thereof, a motor and propeller pivotally supported thereby, a vertical longitudinally arranged sector connected to said motor and having teeth on one side, a spur gear adapted to mesh with said sector, a guide member in frictional contact with the untoothed side of said sector, a carburetor and a flexible feed connection therefor, a rudder at one end of said car body, and said frame adapted to support and simultaneously rotate said motor and propeller in a semi-circular plane on a transverse horizontal axis, whereby said propeller when actuated by said motor is adapted to cause said aircraft to be propelled forwardly, or to vertically ascend or descend.

10. In an airship, an enclosed car body having a rudder at one exterior end thereof and an outrigged mounting provided with a vertical transverse frame disposed at the other exterior end thereof and pivotally supporting a motor and propeller, said motor connected to a vertical longitudinally arranged sector having teeth on one side adapted to mesh with a spur gear connected to a hand wheel interior of said car body, a guide member in frictional contact with the untoothed side of said sector, a flexible feed connection between said motor and a carburetor detached from said motor, a flexible air-duct connected to an air scoop disposed to the rear of said propeller and exposed to the slip-stream thereof, said propeller and said frame adapted to support and simultaneously rotate said motor, propeller and scoop in a semicircular vertical plane on a transverse horizontal axis by means of said hand wheel, whereby said propeller, when actuated by said motor is adapted to cause said airship to be propelled forwardly, or to vertically ascend or descend.

11. In an airship, a car body having a rudder at one end thereof and an outrigged mounting provided with a vertical transverse frame disposed at the other end thereof and pivotally supporting a motor and propeller, said motor connected to a vertical longitudinally arranged sector having teeth on one side adapted to mesh with a spur gear connected to a hand wheel, a hinged guide member in frictional contact with the untoothed side of said sector, a flexible feed connection between said motor and a carburetor detached from said motor, a flexible air-duct connected to an air damper interior of said ballonet and an air scoop disposed to the rear of said propeller and exposed to the slipstream thereof, and said frame adapted to support and simultaneously rotate said motor, propeller and scoop within a semi-circular vertical plane on a transverse horizontal axis by means of said hand wheel, whereby said propeller, when actuated by said motor is adapted to cause said airship to be propelled forwardly, or to vertically ascend or descend.

12. In an airship, an enclosed car body having a rudder disposed at one exterior end thereof and an outrigged mounting provided with a vertical transverse frame disposed at the other exterior end thereof and pivotally supporting a motor and propeller, said motor connected to a vertical longitudinally arranged sector having teeth on one side adapted to mesh with a spur gear connected to a hand wheel interior of said car body, a guide member in frictional contact with the untoothed side of said sector, a flexible feed connection between said motor and a carburetor detached from said motor, a flexible air-duct connected to an air scoop disposed to the rear of said propeller and exposed to the slip-stream thereof, a fuel tank, a throttle interior of said car body, and said frame adapted to support and simultaneously rotate said motor, propeller and scoop in a semi-circular vertical plane on a transverse horizontal axis by means of said hand wheel, whereby said propeller, when actuated by said motor is adapted to cause said airship to be propelled forwardly, or to vertically ascend or descend.

13. In an airship, an enclosed car body having an outrigged mounting disposed at one exterior end thereof and provided with a movable vertical transverse frame pivotally supporting a motor and propeller, said frame having rearwardly disposed upper and lower pivoted extensions, one of said extensions having teeth adapted to mesh with a spur gear connected to a hand wheel interior of said car body, whereby said motor, propeller and forward end portions of a movable vertically and longitudinally arranged sector may be adjusted from side to side, said sector having teeth on one side adapted to mesh with a spur gear connected to a second hand wheel interior of said car body, the meshing portion of said sector-teeth adapted to frictionally move or slide forwardly and backwardly over the meshing portion of the teeth of said gear simultaneously as said motor, propeller and forward end portions of said sector are adjusted from side to side by said second hand wheel, whereby said propeller is adapted to steer said airship to one side or the other, a guide member in pressure contact with the untoothed side of said sector, whereby the teeth on said sector are held in constant mesh with the teeth of said gear, a flexible feed connection between said motor and a carburetor detached from said motor, whereby the position of said motor may be adjusted relative to, or independently of, said carburetor, a flexible air-duct connected to an air scoop disposed to the rear of said propeller and exposed to the slip-stream thereof, and said frame adapted to simultaneously rotate said motor, propeller and scoop in a semi-circular vertical plane on a transverse axis and in a horizontal plane on a vertical axis, whereby said propeller is adapted to steer said airship to one side or the other or to cause said airship to be propelled forwardly or to vertically ascend or descend by means of said hand wheels.

14. In an airship, an enclosed car body having a stabilizer disposed at one exterior end thereof and an outrigged mounting disposed at the other exterior end thereof, said outrigged mounting provided with a movable vertical transverse frame pivotally supporting a motor and propeller, said frame having rearwardly disposed upper and lower pivoted extensions, one of said extensions having teeth adapted to mesh with a spur gear connected to a handwheel interior of said car body, whereby said motor, propeller and forward end portions of a movable vertically and longitudinally arranged sector may be adjusted from side to side, said sector having teeth on one side adapted to mesh with a spur gear connected to a hand wheel, a guide member in frictional contact with the untoothed side of said sector, a flexible feed connection between said motor and a carburetor detached from said motor, a flexible air-duct connected to an air damper interior of said ballonet and an air scoop disposed to the rear of said propeller and exposed to the slip-stream thereof, and said frame adapted to support and simultaneously rotate said motor, propeller and scoop within a semi-circular vertical plane on a transverse horizontal axis by means of said hand-wheel, whereby said propeller, when actuated by said motor is adapted to cause said airship to be propelled forwardly, or to vertically ascend or descend.

15. In an airship, an enclosed car body having an outrigged mounting disposed at one exterior end thereof and provided with a movable vertical transverse frame pivotally supporting a motor and propeller, said frame having rearwardly disposed upper and lower pivoted extensions, one of said extensions having teeth adapted to mesh with a spur gear connected to a hand wheel interior of said car body, whereby said motor, propeller and forward end portions of a movable vertically and longitudinally arranged sector may be adjusted from side to side, said motor having vertical members connected to said sector, whereby said sector is adapted to rotate said motor and propeller on a transverse horizontal axis by means of said hand wheel, said sector having teeth on one side adapted to mesh with a spur gear connected to a second hand wheel interior of said car body, the meshing portion of said sector-teeth adapted to frictionally slide or move forwardly and backwardly over the meshing portion of the teeth of said gear simultaneously as said motor, propeller and forward end portions of said sector are adjusted from side to side by said second hand wheel, whereby said propeller is adapted to steer said airship to one side or the other, a guide member in pressure contact with the untoothed side of said sector, whereby the teeth on said sector are held in constant mesh with the teeth of said gear, a flexible feed connection between said motor and a carburetor detached from said motor, whereby the position of said motor may be adjusted relative to, or independently of, said carburetor, a flexible air-duct connected to an air scoop disposed to the rear of said propeller and exposed to the slip-stream thereof, and said frame adapted to simultaneously rotate said motor, propeller and scoop in a semi-circular vertical plane on a transverse axis and in a horizontal plane on a vertical axis, whereby said propeller is adapted to steer said airship to one side or the other or to cause the airship to be propelled forwardly or to vertically ascend or descend by means of said hand wheels.

16. In an airship, a car body having a rudder at one end thereof and an outrigged mounting provided with a vertical transverse frame disposed at the other end thereof and pivotally supporting a longitudinally arranged sector having teeth on one side adapted to mesh with a spur gear connected to a hand wheel, a pressure guide member having a stop, said guide member in frictional contact with the untoothed side of said sector, a flexible feed connection between said motor and a carburetor detached from said motor, a flexible air-duct connected to an air damper interior of said ballonet and an air scoop disposed to the rear of said propeller and exposed to the slip-stream thereof, and said frame adapted to support and simultaneously rotate said motor, propeller and scoop within a semi-circular vertical plane on a transverse horizontal axis by means of said hand wheel, whereby said propeller, when actuated by said motor is adapted to cause said airship to be propelled forwardly, or to vertically ascend or descend.

17. In an airship, an enclosed car body having an outrigged mounting disposed at one exterior end thereof and provided with a movable vertical transverse frame pivotally supporting a motor and propeller, said frame having rearwardly disposed upper and lower pivoted extensions, one of said extensions having teeth adapted to mesh with a spur gear connected to a hand wheel interior of said car body, whereby said motor, propeller and forward end portions of a movable vertically and longitudinally arranged sector may be adjusted from side to side, said motor having vertical connecting members pivoted to said sector, whereby said sector is adapted to move toward either the right or left side, said sector having teeth on one side adapted to mesh with a spur gear connected to a second hand wheel interior of said car body, the meshing portion of said sector-teeth adapted to frictionally slide or move forwardly and backwardly over the meshing portion of the teeth of said gear simultaneously as said motor, propeller and forward-end-portions of said sector are adjusted from side to side by said second hand wheel, whereby said propeller is adapted to steer said airship to one side or the other, a guide member in pressure contact with the untoothed side of said sector whereby the teeth on said sector are held in constant mesh with the teeth of said gear, a flexible feed connection between said motor and a carburetor detached from said motor, whereby the position of said motor may be adjusted relative to, or independently of, said carburetor, a flexible air-duct connected to an air scoop disposed to the rear of said propeller and exposed to the slip-stream thereof, and said frame adapted to simultaneously rotate said motor, propeller, and scoop in a semi-circular vertical plane on a transverse axis and in a horizontal plane on a vertical axis, whereby said propeller is adapted to steer said airship to one side or the other or to cause said airship to be propelled forwardly or to vertically ascend or descend by means of said hand wheels.

18. In an airship, an enclosed car body having an outrigged mounting disposed at one exterior end thereof and provided with a movable vertical transverse frame pivotally supporting a motor and propeller, said frame having rearwardly disposed upper and lower pivoted extensions, one of said extensions having teeth adapted to mesh with a spur gear connected to a hand wheel interior of said car body, whereby said motor, propeller and forward end portions of a movable vertically and longitudinally arranged sector may be adjusted from side to side, said sector having teeth on one side adapted to mesh with a spur gear connected to a second hand wheel interior of said car body, the meshing portion of said sector-teeth adapted to frictionally slide or move forwardly and backwardly over the meshing portion of the teeth of said gear simultaneously as said motor, propeller and forward-end-portions of said sector are adjusted from side to side by said second hand wheel, whereby said propeller is adapted to steer said airship to one side or the other, a resilient guide member in contact with the untoothed side of said sector, whereby the teeth on said sector are held in constant mesh with the teeth of said gear, a flexible feed connection between said motor and a carburetor detached from said motor, whereby the position of said motor may be adjusted relative to, or independently of, said carburetor, a flexible air-duct connected to an air scoop disposed to the rear of said propeller and exposed to the slip-stream thereof, and said frame adapted to simultaneously rotate said motor, propeller, and scoop in a semi-circular vertical plane on a transverse axis and in a horizontal plane on a vertical axis, whereby said propeller is adapted to steer said airship to one side or the other or to cause said airship to be propelled forwardly or to vertically ascend or descend by means of said hand wheels.

19. In an airship, in combination with a car body having a rudder disposed at one exterior end thereof and an outrigged mounting disposed at the other exterior end thereof, said mounting provided with means for pivoting a motor within a supporting and rotating frame, said motor connected to a vertical sector having teeth on one side adapted to mesh with a spur gear connected to a hand wheel, a guide member in frictional contact with the untoothed side of said sector, a flexible feed connection between said motor and a detached carburetor, a flexible air duct connected to an air damper interior of said ballonet and an air scoop disposed to the rear of said propeller and exposed to the slip-stream thereof, and said frame adapted to support and simultaneously rotate said motor, propeller and scoop within a semi-circular vertical plane on a transverse horizontal axis by means of said hand wheel, whereby said propeller, when actuated by said motor is adapted to cause said airship to be propelled forwardly or to vertically ascend or descend.

20. In an airship, in combination with an enclosed car body having an outrigged mounting disposed at one exterior end thereof and provided with a movable vertical transverse frame pivotally supporting a motor and propeller disposed at the other exterior end thereof, said frame having rearwardly disposed upper and lower pivoted extensions, one of said extensions having teeth adapted to mesh with a spur gear connected to a hand wheel interior of said car body, whereby said motor, propeller and forward end portions of a movable vertically and longitudinally arranged sector may be adjusted from side to side, said sector having teeth on one side adapted to mesh with a spur gear connected to a second hand wheel interior of said car body, the meshing portion of said sector teeth adapted to frictionally slide or move forwardly and backwardly over the meshing portion of the teeth of said gear simultaneously as said motor, propeller and forward end portions of said sector are adjusted from side to side by said second hand wheel, whereby said propeller is adapted to steer said airship to one side or the other, a guide member in contact with the untoothed side of said sector whereby the teeth on said sector are held in constant mesh with the teeth of said gear, a flexible feed connection between said motor and a carburetor detached from said motor whereby the position of said motor and propeller may be adjusted relative to, or independently of, said carburetor, a flexible air-duct connected to an air scoop disposed to the rear of said propeller and exposed to the slip-stream thereof, and said frame adapted to simultaneously rotate said motor, propeller, and scoop in a semi-circular vertical plane on a transverse axis and in a horizontal plane on a vertical axis, whereby said propeller is adapted to steer said airship to one side or the other or to cause said airship to be propelled forwardly or to vertically ascend or descend by means of said hand wheels.

CHARLES W. WALLER.